United States Patent
Murase et al.

(10) Patent No.: US 11,999,276 B2
(45) Date of Patent: Jun. 4, 2024

(54) VEHICLE SEAT

(71) Applicant: TOYOTA BOSHOKU KABUSHIKI KAISHA, Aichi (JP)

(72) Inventors: Yoshihiro Murase, Aichi (JP); Yuki Kawabata, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 109 days.

(21) Appl. No.: 17/967,179

(22) Filed: Oct. 17, 2022

(65) Prior Publication Data

US 2023/0131755 A1 Apr. 27, 2023

(30) Foreign Application Priority Data

Oct. 22, 2021 (JP) ................................ 2021-173351

(51) Int. Cl.
*B60N 2/42* (2006.01)
*B60N 2/427* (2006.01)
*B60N 2/68* (2006.01)

(52) U.S. Cl.
CPC .......... *B60N 2/42745* (2013.01); *B60N 2/68* (2013.01); *B60N 2/4221* (2013.01); *B60N 2/4228* (2013.01); *B60N 2/42709* (2013.01)

(58) Field of Classification Search
CPC ............ B60N 2/42745; B60N 2/42709; B60N 2/4228; B60N 2/4221
See application file for complete search history.

(56) References Cited

U.S. PATENT DOCUMENTS

| | | | | |
|---|---|---|---|---|
| 3,501,200 A * | 3/1970 | Seizo | ........................ | B60N 2/68 296/68.1 |
| 6,164,720 A * | 12/2000 | Haglund | ............ | B60N 2/42745 297/378.12 |
| 6,296,306 B1 * | 10/2001 | Specht | ................... | B60N 2/809 297/216.13 |
| 6,709,053 B1 * | 3/2004 | Humer | ............... | B60N 2/42709 297/216.14 |
| 8,052,195 B2 * | 11/2011 | Aufrere | ............. | B60N 2/42745 296/68.1 |
| 9,162,595 B2 * | 10/2015 | Seo | ..................... | B60N 2/42709 |
| 9,296,316 B2 * | 3/2016 | Kitou | ..................... | B60N 2/682 |
| 9,511,691 B2 * | 12/2016 | Komatsubara | ........... | B60N 2/07 |
| 10,259,358 B2 * | 4/2019 | Mizobata | ............. | B60N 2/4228 |

(Continued)

FOREIGN PATENT DOCUMENTS

WO 2020/103920 5/2020

*Primary Examiner* — Syed A Islam
(74) *Attorney, Agent, or Firm* — GREENBLUM & BERNSTEIN, P.L.C.

(57) ABSTRACT

In a structure in which a lower arm is fixed to a vehicle, provided is a vehicle seat that can reduce an impact applied to a recliner. One aspect of the present disclosure is a vehicle seat including a lower arm and a recliner. The lower arm includes an arm body to which the recliner is attached, a first fixing portion to be attached to the vehicle in a lower position, and a second fixing portion attached to the vehicle in a rear position. The arm body includes a first recess arranged between the recliner and the first fixing portion in an up-down direction, the first recess extending from an edge of the arm body, and a second recess arranged between the recliner and the second fixing portion in a front-rear direction, the second recess extending from the edge of the arm body.

5 Claims, 7 Drawing Sheets

(56) References Cited

U.S. PATENT DOCUMENTS

| | | | |
|---|---|---|---|
| 10,369,907 B2* | 8/2019 | Baba | B60N 2/4228 |
| 11,607,976 B2* | 3/2023 | Schmitz | B60N 2/42709 |
| 11,673,497 B2* | 6/2023 | Denis | B60N 2/42745 |
| | | | 297/452.18 |
| 2020/0130544 A1* | 4/2020 | Schmidt | B60N 2/20 |

* cited by examiner

VEHICLE SEAT

CROSS-REFERENCE TO RELATED APPLICATIONS

This application claims the benefit of priority based on Japanese patent application No. 2021-173351 filed on Oct. 22, 2021 with the Japan Patent Office and the entire disclosure of which is incorporated herein by reference.

BACKGROUND

The present disclosure relates to a vehicle seat.

In a vehicle seat to be installed in a car, an automobile, or the like, a recliner is provided between a back frame and a lower arm arranged below the back frame to cause a seatback to pivot relative to a seat cushion.

In such a vehicle seat, in order to absorb an impact on the back frame at the time of a vehicle crash and to protect the recliner, a structure is known in which the lower arm is easily deformed (see WO 2020/103920).

SUMMARY

In the deformation structure of the above-described lower arm, it is supposed that the lower arm is connected to the cushion frame. Thus, in a structure in which the lower arm is directly fixed to the vehicle, the impact cannot be sufficiently absorbed.

In one aspect of the present disclosure, it is preferable, in the structure in which the lower arm is fixed to the vehicle, to provide a vehicle seat that can reduce the impact applied to the recliner at the time of a crash.

One aspect of the present disclosure is a vehicle seat including a seat cushion, a seatback pivotable in a seat front-rear direction relative to the seat cushion, a back frame supporting the seatback, a first lower arm configured to be attached to a vehicle, and a recliner connected to the back frame and the first lower arm, the recliner being configured to cause the back frame to pivot in the seat front-rear direction relative to the first lower arm.

The first lower arm includes an arm body having a plate shape and having the recliner attached thereto, a first fixing portion configured to be attached to the vehicle in a position below the recliner, and a second fixing portion configured to be attached to the vehicle in a position on a seat rear side relative to the recliner.

The arm body includes a first recess arranged between the recliner and the first fixing portion in an up-down direction, the first recess extending from an edge of the arm body toward an internal area of the arm body, the first recess being recessed in a seat-width direction, and a second recess arranged between the recliner and the second fixing portion in the seat front-rear direction, the second recess extending from the edge of the arm body toward the internal area of the arm body, the second recess being recessed in the seat-width direction.

In this configuration, when an impact is applied to the seatback from the rear, the first recess is compressed and deformed, and the second recess is pulled and deformed so that the recess becomes small. These deformations allow to reduce the impact applied to the recliner at the time of a front crash of the vehicle.

When an impact is applied to the seatback from the front, the second recess is compressed and deformed, and the first recess is pulled and deformed so that the recess becomes small. These deformations allow to reduce the impact applied to the recliner at the time of a rear crash of the vehicle.

Therefore, the strength required for the back frame and the first recliner against the impacts at the time of a vehicle crash can be reduced. Thus, it is possible to reduce the cost and the weight of the vehicle seat.

One aspect of the present disclosure may further include a second lower arm connected to the back frame in a position separated from the first lower arm in the seat-width direction, and a rod connecting the first lower arm and the second lower arm in the seat-width direction. At least a part of the first recess may be arranged above the rod. Such a configuration can enhance an effect that the first recess absorbs the impact when the impact is applied to the seatback from the rear.

In one aspect of the present disclosure, in the arm body, the first recess may be recessed inward in the seat-width direction. In this configuration, when the impact is applied to the seatback from the rear, the first recess can easily absorb a load applied from the outside of the first lower arm in the seat-width direction.

In one aspect of the present disclosure, in the arm body, the second recess may be recessed outward in the seat-width direction. In this configuration, the second recess can easily absorb a load, at the time of the rear crash, of an occupant seated in the vehicle seat.

In one aspect of the present disclosure, the first recess and the second recess may each have a shape in which a width and a depth are increased toward the edge of the arm body. In this configuration, the lengths of the first recess and the second recess in the edge of the arm body increase, thereby allowing these recesses to be easily deformed. As a result, an amount of impact absorption can be increased.

BRIEF DESCRIPTION OF THE DRAWINGS

Example embodiments of the present disclosure will be described hereinafter by way of example with reference to the accompanying drawings, in which.

DETAILED DESCRIPTION OF EXEMPLARY EMBODIMENTS

1. First Embodiment

1-1. Configuration

Figure 1:
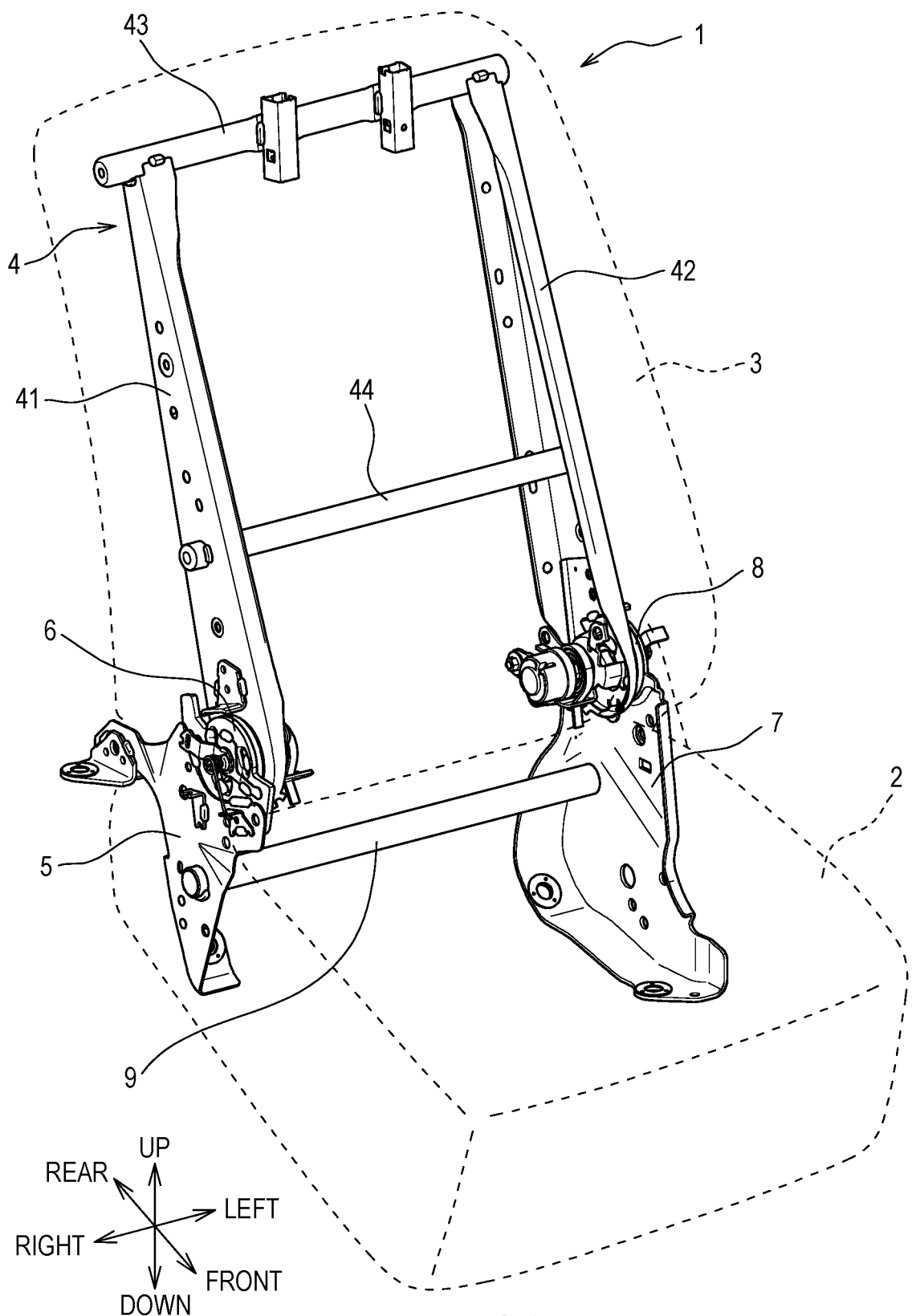
FIG. 1 is a schematic perspective view showing a vehicle seat of an embodiment.

A vehicle seat 1 shown in FIG. 1 includes a seat cushion 2, a seatback 3, a back frame 4, a first lower arm 5, a first recliner 6, a second lower arm 7, a second recliner 8, and a rod 9.

The vehicle seat 1 is used as a seat in a passenger car. Specifically, the vehicle seat 1 serves as a left rear seat of the passenger car. On the right side of the vehicle seat 1, a seat for two persons is installed, which is made up of a right rear seat integrated with a center rear seat.

Note that directions in the following description and the drawings mean directions in a state where the vehicle seat 1 is installed in a vehicle (i.e. a passenger car). In this embodiment, "seat-width direction" corresponds to a left-right direction of the vehicle, and "seat front side" corresponds to the front of the vehicle.

The seat cushion 2 is a part to support the buttocks of an occupant. The seatback 3 is a part to support the back of the occupant. The seatback 3 is pivotable in a seat front-rear direction relative to the seat cushion 2.

The back frame 4 supports the seatback 3, and is pivotable in the seat front-rear direction together with the seatback 3. The back frame 4 includes a first side frame 41, a second side frame 42, an upper frame 43, and a connecting member 44.

The first side frame 41 and the second side frame 42 each extend in an up-down direction, and are arranged separately from each other in the seat-width direction. The first side frame 41 is arranged on the right side of the second side frame 42.

The upper frame 43 connects an upper end of the first side frame 41 and an upper end of the second side frame 42 in the seat-width direction. The connecting member 44 connects the first side frame 41 and the second side frame 42 in the seat-width direction in a position below the upper frame 43.

<First Lower Arm>

The first lower arm 5 is a plate-shaped frame configured to be attached to the vehicle.

The first lower arm 5 is connected to a lower end of the first side frame 41 through the first recliner 6. That is, the first side frame 41 is connected to the vehicle through the first lower arm 5. The first lower arm 5 is arranged on the outside of the first side frame 41 in the seat-width direction. Features of the first lower arm 5 will be described below.

<First Recliner>

The first recliner 6 is connected to the first side frame 41 of the back frame 4 and the first lower arm 5.

The first recliner 6 is a well-known device configured to pivot the back frame 4 in the seat front-rear direction relative to the first lower arm 5 (i.e. relative to the vehicle and the seat cushion 2). The first recliner 6 and the second recliner 8 constitute a manual-type reclining device.

Figure 2:
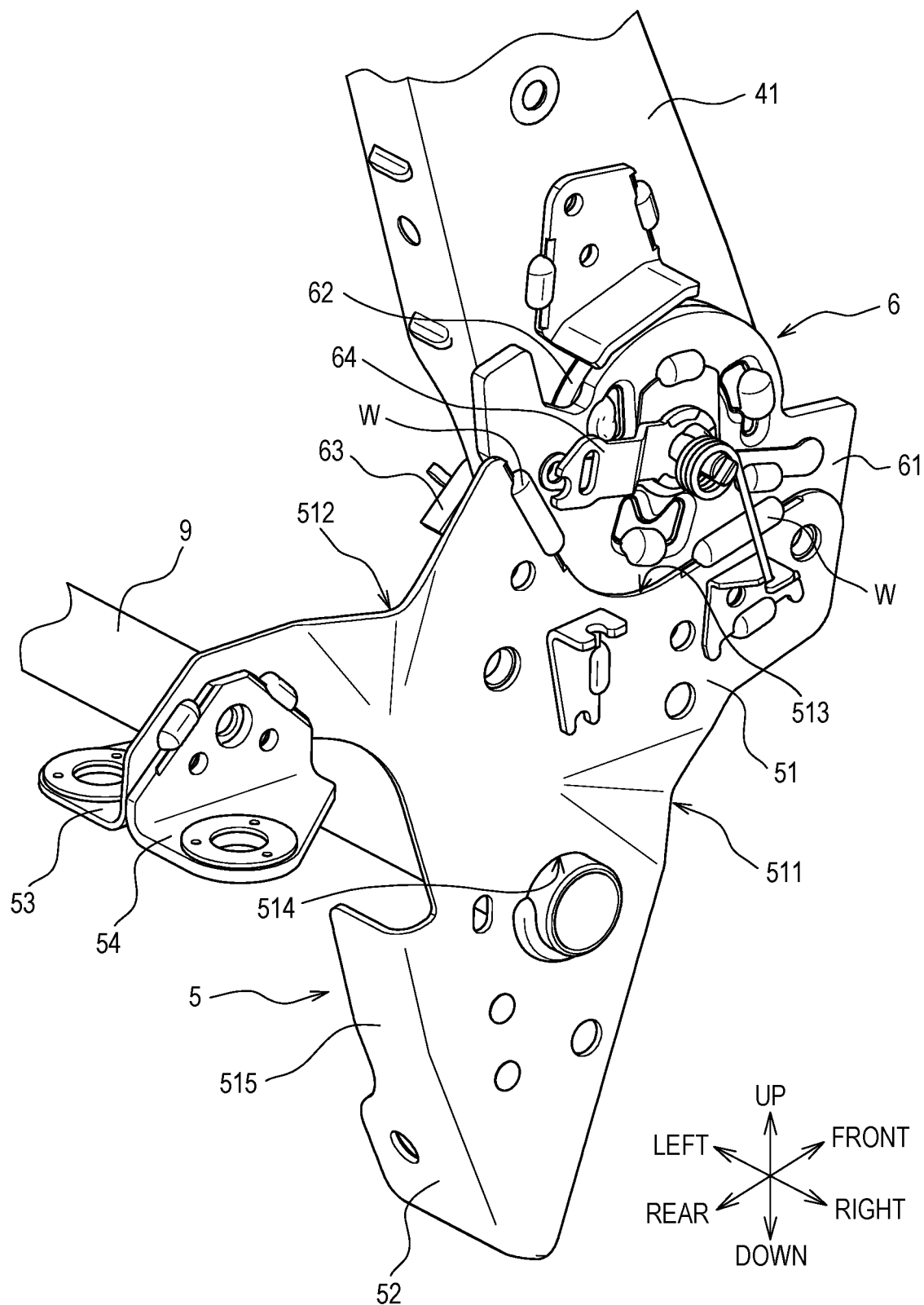
FIG. 2 is a schematic perspective view showing a first lower arm, a first recliner, and a rod in the vehicle seat of FIG. 1.

As shown in FIG. 2, the first recliner 6 includes a recliner plate 61, a recliner body 62, a pivoting force imparting spring 63, and a release lever 64. The recliner plate 61 is overlapped with the first lower arm 5 from the inside (i.e. from the left) in the seat-width direction. The recliner plate 61 is fixed to the first lower arm 5 by welding.

The recliner body 62 is connected to an inner plate surface (i.e. left surface) of the recliner plate 61 and the first side frame 41. The recliner body 62 has a locking mechanism that switches the presence or absence of a restriction (i.e. lock) on pivoting of the first side frame 41. The lock of the recliner body 62 is controlled through the release lever 64.

The pivoting force imparting spring 63 forms a pivoting force generation mechanism for providing a pivoting force relative to the recliner plate 61 to the first side frame 41. The pivoting force imparting spring 63 is connected to the first side frame 41 and the recliner plate 61.

<Second Lower Arm>

The second lower arm 7 shown in FIG. 1 is a plate-shaped frame configured to be attached to the vehicle.

The second lower arm 7 is connected to the back frame 4 in a position separated from the first lower arm 5 in the seat-width direction. Specifically, the second lower arm 7 is connected to a lower end of the second side frame 42 through the second recliner 8. That is, the second side frame 42 is connected to the vehicle through the second lower arm 7.

<Second Recliner>

The second recliner 8 is connected to the second side frame 42 of the back frame 4 and the second lower arm 7.

The second recliner 8 is a well-known device configured to cooperate with the first recliner 6 to pivot the back frame 4 in the seat front-rear direction relative to the second lower arm 7 (i.e. relative to the vehicle and the seat cushion 2).

<Rod>

The rod 9 is a tubular member connecting the first lower arm 5 and the second lower arm 7 in the seat-width direction.

The rod 9 penetrates through each of the first lower arm 5 and the second lower arm 7 in a thickness direction thereof. The rod 9 is fixed to the first lower arm 5 and the second lower arm 7 by welding, for example.

<Features of First Lower Arm>

Figure 3:
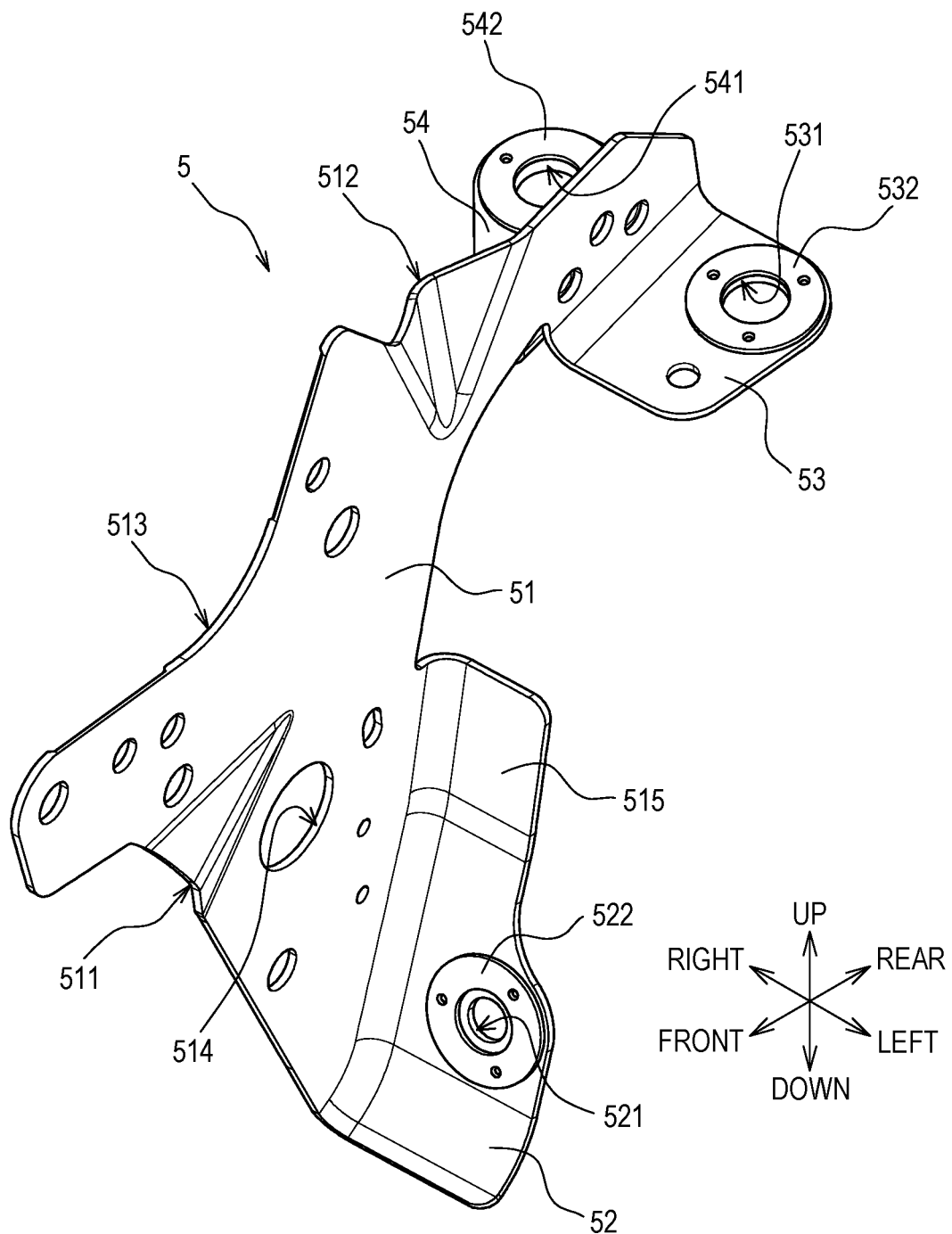
FIG. 3 is a schematic perspective view showing the first lower arm of FIG. 2.

As shown in FIG. 3, the first lower arm 5 includes an arm body 51, a first fixing portion 52, a second fixing portion 53, and a third fixing portion 54.

[Arm Body]

The arm body 51 is a plate-shaped part to which the first recliner 6 is fixed. The first recliner 6 is welded and fixed on an inner plate surface (i.e. left surface) of the arm body 51 in the seat-width direction.

The thickness direction of the arm body 51 corresponds to the seat-width direction. The arm body 51 includes a first recess 511, a second recess 512, a recliner fixing end 513, and a rod insertion hole 514.

The first recess 511 is a part where a part of the arm body 51 is recessed in the seat-width direction (i.e. in the thickness direction of the arm body 51). Specifically, the first recess 511 is recessed inward in the seat-width direction so that an outer surface thereof is bent inward in the seat-width direction (i.e. toward the left).

The first recess 511 extends from a front end, which is a part of an edge of the arm body 51, toward an internal area of the arm body 51. The first recess 511 has a shape in which a width and a depth (i.e. recessed amount) are gradually increased from the internal area of the arm body 51 toward the front end of the arm body 51 (i.e. toward the front). When seen from the seat-width direction, the first recess 511 has a triangle shape made up of a vertex located in the internal area of the arm body 51 and the base that is a part of the front end of the arm body 51.

The second recess 512 is a part where a part of the arm body 51 is recessed in the seat-width direction. Specifically, the second recess 512 is recessed outward in the seat-width direction so that an outer surface thereof is bent outward in the seat-width direction (i.e. toward the right).

The second recess 512 extends from an upper end, which is a part of the edge of the arm body 51, toward the internal area of the arm body 51. The second recess 512 has a shape in which a width and a depth are gradually increased from the internal area of the arm body 51 toward the upper end of the arm body 51 (i.e. upward). When seen from the seat-width direction, the second recess 512 has a triangle shape made up of a vertex being located in the internal area of the arm body 51 and the base that is a part of the upper end of the arm body 51.

The recliner fixing end 513 is formed of a part of the upper end of the arm body 51. The recliner fixing end 513 is located above the first recess 511 and on the seat front side relative to the second recess 512.

Figure 4:
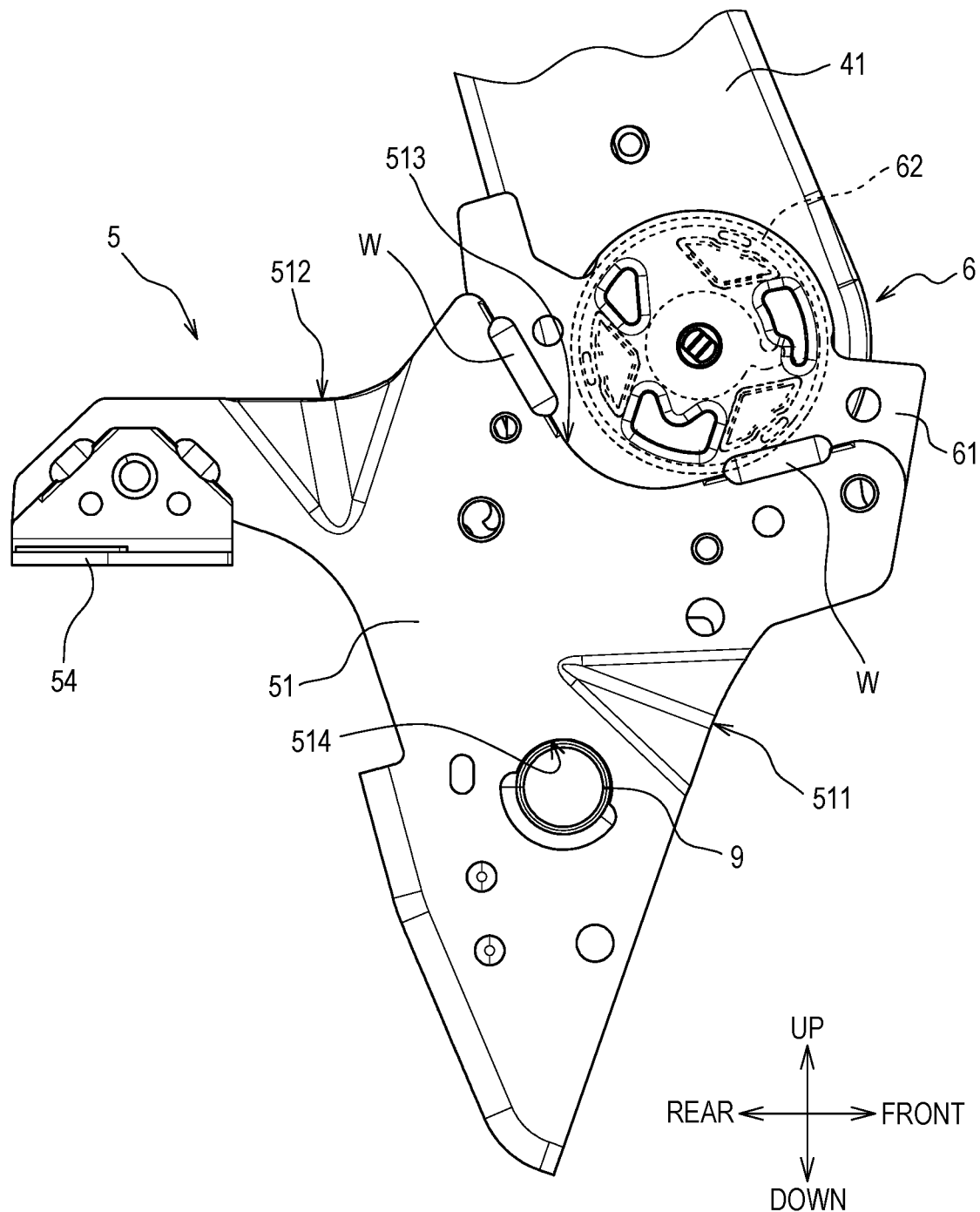
FIG. 4 is a schematic left side view showing the first lower arm and the first recliner of FIG. 2.

As shown in FIG. 4, the recliner fixing end 513 is overlapped with the recliner plate 61 of the first recliner 6 in the seat-width direction. The recliner plate 61 is welded to the recliner fixing end 513 through multiple weld beads W formed to be astride the recliner fixing end 513 and the recliner plate 61.

Figure 5:
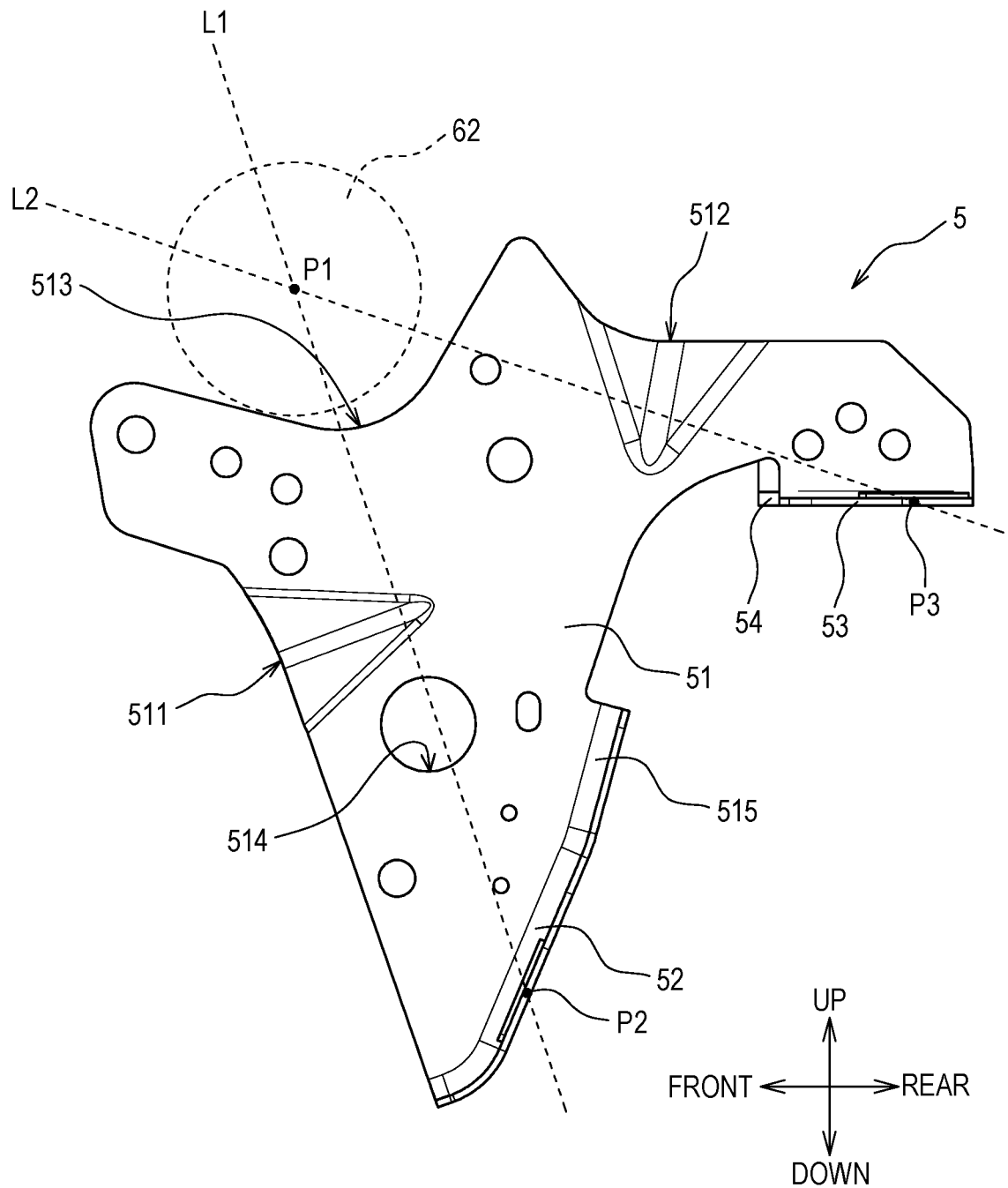
FIG. 5 is a schematic right side view showing the first lower arm of FIG. 2.

The rod 9 is inserted through the rod insertion hole 514. As shown in FIG. 5, the rod insertion hole 514 is located in an area between the first recess 511 and the first fixing portion 52 in the arm body 51.

[First Fixing Portion]

The first fixing portion 52 shown in FIG. 3 is a plate-shaped part configured to be attached to the vehicle in a position below the first recliner 6.

The first fixing portion 52 protrudes inward in the seat-width direction from the arm body 51. The first fixing portion 52 is formed by bending the plate constituting the arm body 51, and is formed integrally with the arm body 51.

The first fixing portion 52 has a reinforcing part 515 in the upper part thereof to enhance the strength of the first fixing portion 52. The reinforcing part 515 is a part formed by bending a part of the arm body 51 together with the first fixing portion 52 in the seat-width direction. The length of the reinforcing part 515 in the seat-width direction is smaller than that of the first fixing portion 52 in the seat-width direction (see FIG. 3).

The first fixing portion 52 includes a first fixing hole 521 and a first base 522. To the first fixing hole 521, a bolt is inserted to fasten the first fixing portion 52 to a portion to be fixed, which is formed in the vehicle. The first base 522 is arranged to surround the first fixing hole 521.

[Second Fixing Portion]

The second fixing portion 53 is a plate-shaped part configured to be attached to the vehicle in a position on the seat rear side relative to the first recliner 6.

The second fixing portion 53 protrudes inward in the seat-width direction from the arm body 51. The second fixing portion 53 is formed by bending the plate constituting the arm body 51 and is integrated with the arm body 51.

The second fixing portion 53 has a second fixing hole 531 and a second base 532. To the second fixing hole 531, a bolt is inserted to fasten the second fixing portion 53 to a portion to be fixed, which is formed in the vehicle. The second base 532 is arranged to surround the second fixing hole 531.

[Third Fixing Portion]

Figure 6A:
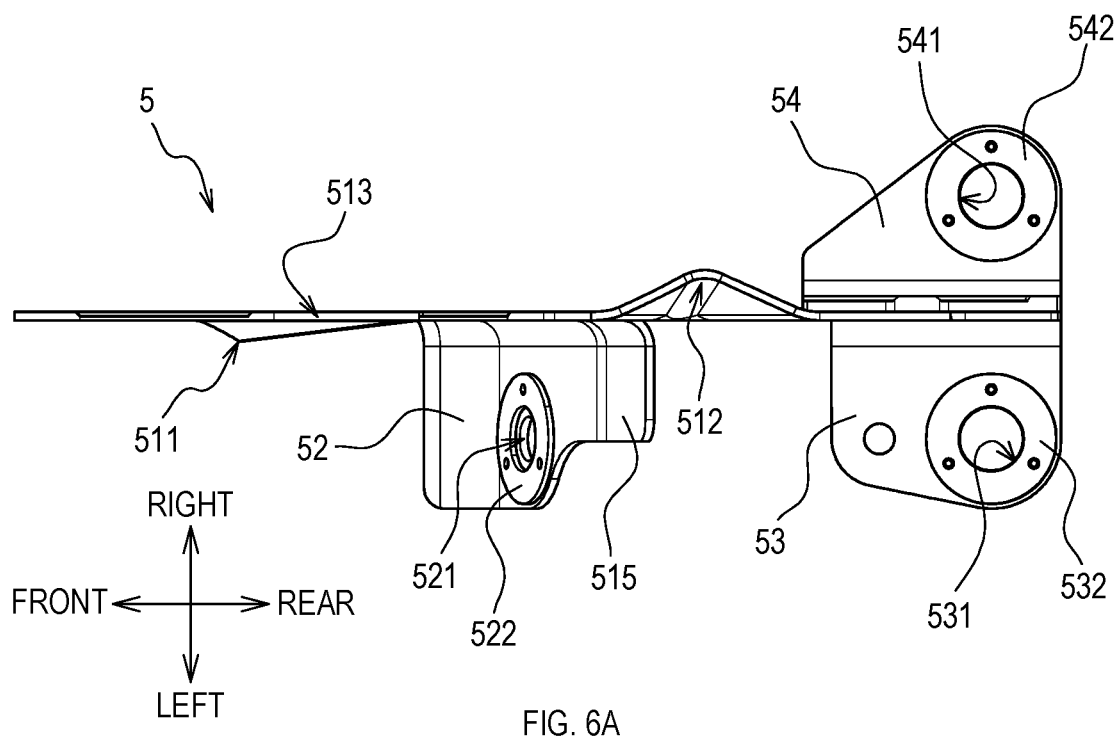
FIG. 6A is a schematic plan view showing the first lower arm of FIG. 2.
Figure 6B:
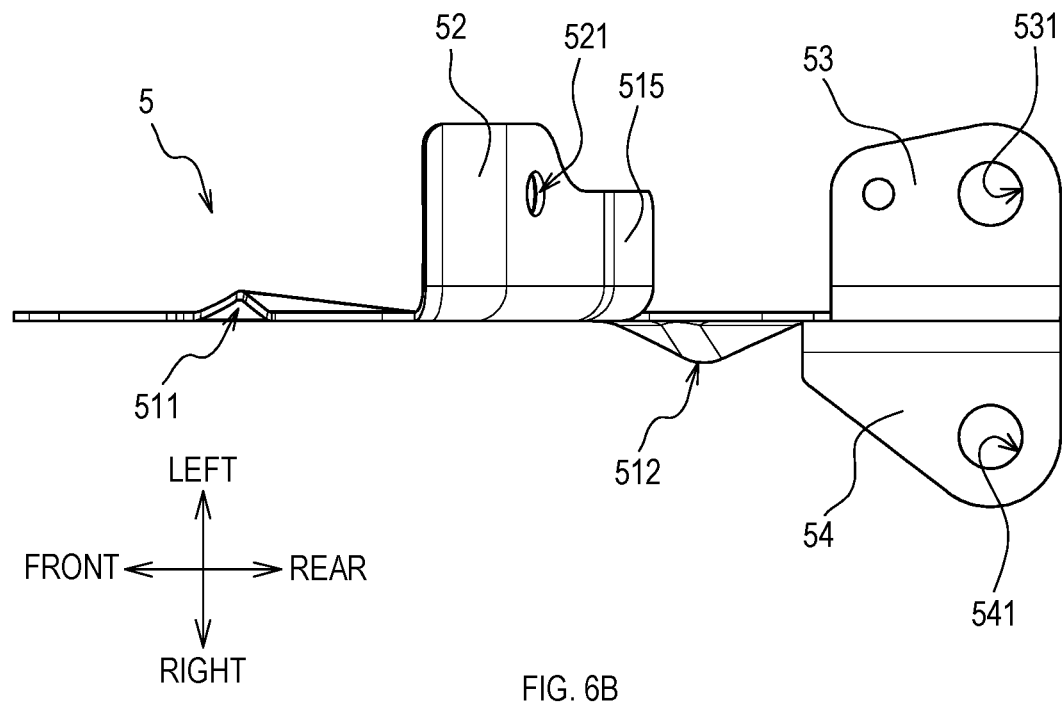
FIG. 6B is a schematic bottom view showing the first lower arm of FIG. 2.

The third fixing portion 54 shown in FIG. 6A and FIG. 6B is a plate-shaped part configured to be attached to the vehicle in a position on the seat rear side relative to the first recliner 6. The third fixing portion 54 is welded and fixed on an outer plate surface of the arm body 51 in the seat-width direction. The third fixing portion 54 protrudes outward in the seat-width direction from the arm body 51.

The third fixing portion 54 has a third fixing hole 541 and a third base 542. To the third fixing hole 541, a bolt is inserted to fasten the third fixing portion 54 to a portion to be fixed, which is formed in the vehicle. The third base 542 is arranged to surround the third fixing hole 541.

[Positions of Recesses]

As shown in FIG. 4, the first recess 511 and the second recess 512 are not overlapped with the first recliner 6 in the seat-width direction. That is, the first recess 511 and the second recess 512 are arranged in the positions not overlapped with both the recliner plate 61 and the recliner body 62.

The first recess 511 is located between the first recliner 6 and the first fixing portion 52 in the up-down direction. Specifically, the front end of the first recess 511 is located below the recliner body 62 of the first recliner 6, and the rear end of the first recess 511 is located on the seat rear side relative to the recliner body 62.

As shown in FIG. 5, the rear end of the first recess 511 is located above the first fixing portion 52, and the front end of the first recess 511 is located on the seat front side relative to the first fixing portion 52. Specifically, when seeing from the seat-width direction, a first virtual straight line L1, which connects a pivot axis P1 of the recliner body 62 and a fastening center P2 of the first fixing portion 52 (i.e. the center of gravity of the first fixing hole 521), is overlapped with the first recess 511. Note that the pivot axis P1 of the recliner body 62 is parallel to the seat-width direction.

Furthermore, the rear end of the first recess 511 is located above the rod 9 (i.e. above the rod insertion hole 514). A part of the front end of the first recess 511 is overlapped with the rod 9 in the seat front-rear direction.

The second recess 512 is located between the first recliner 6 and the second fixing portion 53 in the seat front-rear direction. Specifically, as shown in FIG. 4, the upper end of the second recess 512 is located on the seat rear side relative to the recliner body 62 of the first recliner 6, and the lower end of the second recess 512 is located below the recliner body 62.

As shown in FIG. 5, the second recess 512 is located on an upper side and on the seat front side relative to the second fixing portion 53 and the third fixing portion 54. Specifically, when seeing from the seat-width direction, a second virtual straight line L2, which connects the pivot axis P1 of the recliner body 62 and a fastening center P3 of the second fixing portion 53 (i.e. the center of gravity of the second fixing hole 531), is overlapped with the second recess 512. Furthermore, the second recess 512 is located on the seat rear side and on the upper side relative to the first recess 511.

[1-2. Effects]

With the embodiment described above, the following effects can be obtained.

(1a) When an impact is applied to the seatback 3 from the rear, the first recess 511 is compressed and deformed, and the second recess 512 is pulled and deformed so that the recess becomes small. These deformations allow to reduce the impact applied to the first recliner 6 at the time of the front crash of the vehicle.

When an impact is applied to the seatback 3 from the front, the second recess 512 is compressed and deformed, and the first recess 511 is pulled and deformed so that the recess becomes small. These deformations allow to reduce the impact applied to the first recliner 6 at the time of the rear crash of the vehicle.

Therefore, the strength required for the back frame 4 and the first recliner 6 against the impacts at the time of a vehicle crash can be reduced. Thus, it is possible to reduce the cost and the weight of the vehicle seat 1.

(1b) At least a part of the first recess 511 is arranged above the rod 9, thereby allowing to enhance an impact absorption effect by the first recess 511 when an impact is applied to the seatback 3 from the rear.

(1c) Since the first recess 511 is recessed inward in the seat-width direction, when an impact is applied to the seatback 3 from the rear, the first recess 511 can easily absorb a load applied from the outside of the first lower arm 5 in the seat-width direction.

(1d) Since the second recess 512 is recessed outward in the seat-width direction, the second recess 512 can absorb a load, at the time of the rear crash, of an occupant seated in the vehicle seat 1. Since the second recess 512 deforms outward in the seat-width direction, the welded portion of the third fixing portion 54 compresses. This inhibits the separation of the third fixing portion 54.

(1e) The first recess 511 and the second recess 512 have shapes in which the widths and the depths are gradually increased toward the edge of the arm body 51, and thus, the lengths of the first recess 511 and the second recess 512 in the edge of the arm body 51 increase, thereby allowing these recesses to be easily deformed. As a result, an amount of impact absorption can be increased.

2. Other Embodiments

Although the embodiment of the present disclosure has been described above, it should be appreciated that the present disclosure is not limited to the above embodiment and the present disclosure can take various forms.

(2a) In the vehicle seat of the above-described embodiment, the first recess is not necessarily arranged above the rod. For example, the first recess may be arranged on the seat front side or on a lower side relative to the rod.

(2b) In the vehicle seat of the above described embodiment, the first recess may be recessed outward in the seat-width direction. The second recess may be recessed inward in the seat-width direction.

(2c) In the vehicle seat of the above described embodiment, the shapes of the first recess and the second recess are not limited to the aforementioned shapes. For example, the first recess and the second recess each has a shape having a constant width or depth.

Figure 7:
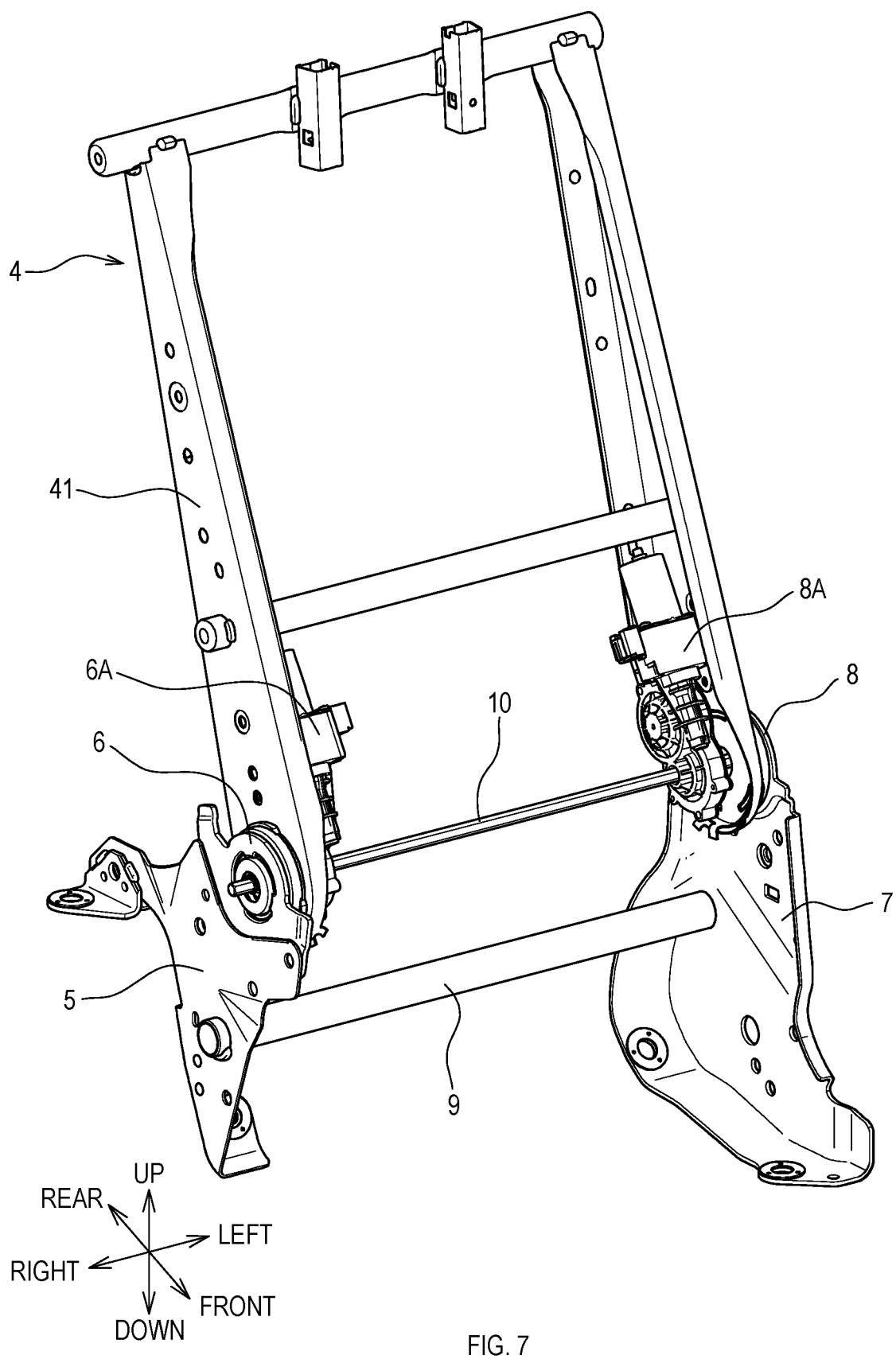
FIG. 7 is a schematic perspective view showing a first recliner and a second recliner in an embodiment different from FIG. 1.

(2d) In the vehicle seat of the above described embodiment, the first recliner may form, together with a second recliner, an electric power reclining device. For example, as shown in FIG. 7, the first recliner 6 may include an actuator 6A instead of the pivoting force imparting spring. The actuator 6A is a power source that provides a pivoting force relative to the recliner plate 61 to the first side frame 41.

The second recliner 8 also has an actuator 8A similar to that of the first recliner 6. The first recliner 6 and the second recliner 8 are connected in the seat-width direction by a connecting rod 10. The connecting rod 10 synchronizes the first recliner 6 and the second recliner 8.

(2e) The vehicle seat of the above-described embodiments can be applied to seats used in automobiles other than passenger cars, and also applied to seats used in vehicles other than automobiles, such as railway vehicles, ships, and aircrafts.

(2f) A function served by a single element in any of the above-described embodiments may be achieved by a plurality of elements, or a function served by a plurality of elements may be achieved by a single element. A part of the configurations of the aforementioned embodiments may be omitted. At least a part of the configurations of the aforementioned embodiment may be added to or replaced with the configurations of the other above-described embodiment. It should be noted that all modes included in the technical idea specified from the wording described in the claims are embodiments of the present disclosure.

What is claimed is:

1. A vehicle seat comprising:
   a seat cushion;
   a seatback pivotable in a seat front-rear direction relative to the seat cushion;
   a back frame supporting the seatback;
   a first lower arm configured to be attached to a vehicle; and
   a recliner connected to the back frame and the first lower arm, the recliner being configured to cause the back frame to pivot in the seat front-rear direction relative to the first lower arm,
   wherein the first lower arm includes
      an arm body having a plate shape and having the recliner attached thereto,
      a first fixing portion configured to be attached to the vehicle in a position below the recliner, and
      a second fixing portion configured to be attached to the vehicle in a position on a seat rear side relative to the recliner,
   wherein the arm body includes
      a first recess arranged between the recliner and the first fixing portion in an up-down direction, the first recess extending from an edge of the arm body toward an internal area of the arm body, the first recess being recessed in a seat-width direction, and
      a second recess arranged between the recliner and the second fixing portion in the seat front-rear direction, the second recess extending from the edge of the arm body toward the internal area of the arm body, the second recess being recessed in the seat-width direction.

2. The vehicle seat according to claim 1, further comprising
   a second lower arm connected to the back frame in a position separated from the first lower arm in the seat-width direction, and
   a rod connecting the first lower arm and the second lower arm in the seat-width direction,
   wherein at least a part of the first recess is arranged above the rod.

3. The vehicle seat according to claim 1,
   wherein in the arm body, the first recess is recessed inward in the seat-width direction.

4. The vehicle seat according to claim 1,
   wherein in the arm body, the second recess is recessed outward in the seat-width direction.

5. The vehicle seat according to claim 1,
   wherein the first recess and the second recess each have a shape in which a width and a depth are increased toward the edge of the arm body.

* * * * *